July 10, 1962     H. M. MORGAN     3,043,324
FLOW VALVE
Filed July 8, 1960

INVENTOR.
HUGH M. MORGAN
BY
ATTORNEY

United States Patent Office 3,043,324
Patented July 10, 1962

3,043,324
FLOW VALVE
Hugh M. Morgan, Culver City, Calif., assignor to Minneapolis-Honeywell Regulator Company, Minneapolis, Minn., a corporation of Delaware
Filed July 8, 1960, Ser. No. 41,692
6 Claims. (Cl. 137—87)

This application is concerned with the design of a flow valve for controlling the flow of gas to water heating apparatus in response to the flow of water to or from said heater.

In prior art controls of this type, there has been a continuing problem of leakage of water from the flow line into the control housing of the valve and thereby causing damage to the controls. Therefore, it is one of the objects of the invention to provide a flow control device which will positively prevent a flow or leakage of water from the flow line into the control portion of the device.

Another object of the invention is to provide a flow control device which is less subject to sticking than prior art devices of the same general kind.

A still further object of the invention is to provide a flow control device wherein the pivot means for the flow sensing means that actuates the controller of the control device, is so connected to the atmosphere that should there be any leakage around the pivot, it would escape to the atmosphere rather than to the controller chamber.

Another object of the invention is to provide a flow valve wherein a flow seat of the valve is held in its assembled relationship with its supporting valve body by means of a conduit connector.

Figure 1:
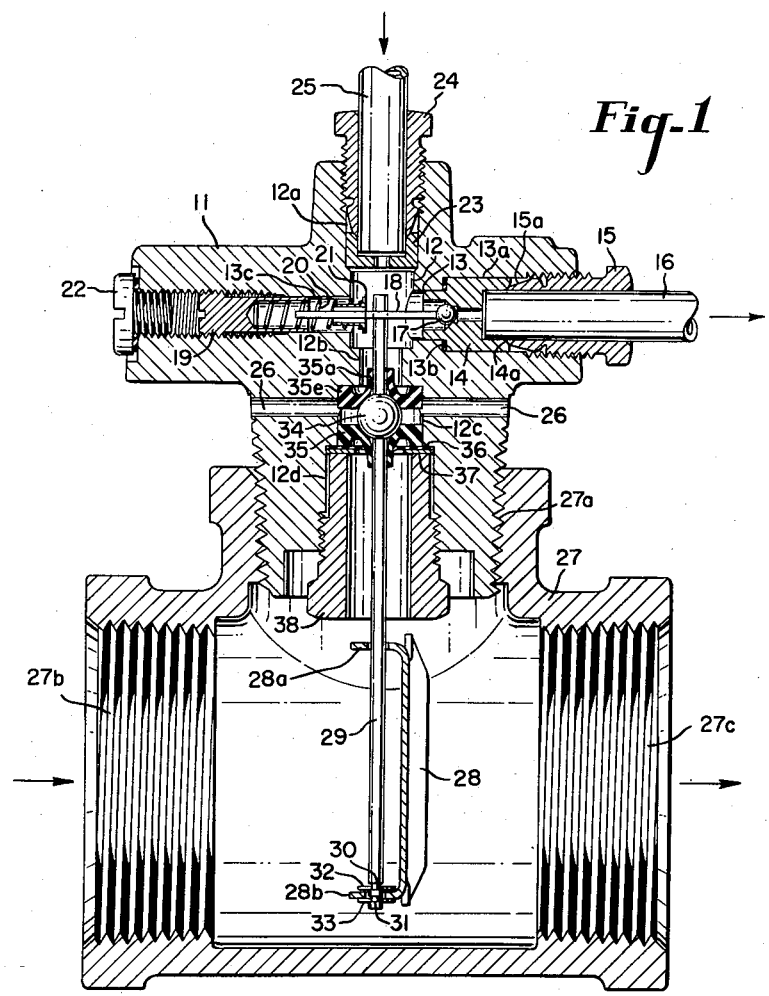
Figures 2, 3:
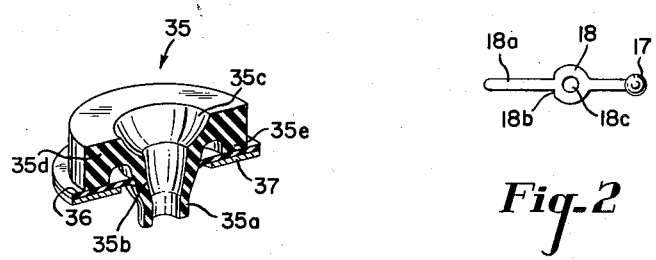

Still further objects of the invention will become apparent upon reading the following detailed description of the invention in conjunction with the accompanying drawing wherein:

FIGURE 1 is a vertical sectional view through the flow responsive control device of the valve type;
FIGURE 2 is a plan view of the ball valve; and
FIGURE 3 is an enlarged perspective sectional view of a sealing ring pivot.

If desired, the gas flow to the heater may be controlled by a separate valve which, in turn, is controlled by a switch rather than the control valve disclosed in the drawing. However, the preferred embodiment of the invention is illustrated in the drawing.

The valve body of the invention is generally designated by the reference numeral 11. Two stepped bores 12 and 13 extend vertically and horizontally through the valve body and intersect substantially centrally thereof.

Positioned in an enlarged diameter portion 13a of the bore 13 is a valve seat member 14 that is held against a shoulder 13b in the bore 13 by means of a conduit coupling 15 screw threaded into the bore 13a and against a beveled portion 14a at the outer end of the valve seat member 14. Due to the fact that the coupling 15 is also beveled at 15a at its inner end, the clamping or holding of the seat member 14 tightly against the shoulder 13b will cause the compressing of the coupling member tightly into engagement with conduit 16.

Cooperating with the valve seat 14 is a ball valve 17 having a stem portion 18 that is a flat plate for a portion of its length and terminates in a stem extension 18a that extends into section 13c of the bore 13 on the opposite side of the bore 12. The bore 13c is threaded at its outer end and has a spring retaining and adjusting member 19 screw threaded therein. The spring retainer 19 has a recessed portion into which a coil compression spring 20 extends. The other end of the spring 20 bears against a spring retainer 21 which, in turn, bears against a shoulder 18b formed at the junction of the extension 18 with the flat plate portion of the stem. The spring 20 normally biases the ball valve 17 into engagement with the valve seat 14 but is yieldable to permit the ball valve 17 to move away from the valve seat. There is an aperture 18c through the plate into which an actuating means for the valve may extend. To prevent gas leakage past the adjusting spring retainer 19 there is an interference fit between 11 and 19 in the bore at 13c, a plug seal 22 is screw threaded into the outer end of the bore 13c for additional protection.

The bore 12 has an enlarged diameter portion 12a at its upper end. A coupling compressor 23, in the form of a sleeve having a beveled upper edge, rests against a shoulder formed at the inner end of the bore portion 12a so that when a coupling 24, similar to the coupling 15, is screw threaded into the bore 12a, it likewise would clamp a conduit 25 positioned therein.

The bore 12 below the bore 13 has a small diameter portion 12b, an intermediate diameter portion 12c and a large diameter portion 12d.

A bore 26 extends transversely through the valve body and through the intermediate bore section 12c intermediate its ends. The purpose of this bore 26 will be presently described.

The lower end of the valve body 11 is externally threaded and is screw threaded into the top opening of a pipe T 27. The T is of conventional construction and has a threaded inlet 27b and a threaded outlet 27c.

Positioned within the T is a flow responsive disc or sail 28 that is supported on the lower end of a valve actuating stem 29. An apertured arm 28a at the upper end of the sail 28 surrounds the stem 29 while the arm 28b at the lower end of the sail surrounds the stem between two annular grooves 30 and 31 in the stem and is retained in that position by means of two split rings 32 and 33. The stem extends through the bores 12d, 12c, 12b and into the cavity formed by the bores 12 and 13. The stem also extends through the aperture 18c in the valve stem 18.

Positioned within the bore section 12c and fixedly secured to and around the stem 29 is a ball pivot 34. The sealing ring 35 surrounds the stem and has a sleeve portion 35a that is relatively thin and normally has an inside diameter slightly less than the diameter of the stem so as to provide a tight fit on the stem. The sleeve portion 35a increases in internal diameter at the lower end thereof to form a conical portion 35b which, in turn, terminates at its lower end in an enlarged diameter portion in the form of a section of a sphere. A flange portion 35d extending outwardly from the spherical portion, has an outside diameter equal to or slightly more than the diameter of the bore portion 12c. The flange portion is thickened at its periphery to provide an upwardly extending rib portion 35e to form an annular groove between the rib portion and the conical portion 35b. The rib portion fits against the shoulder formed between the bore sections 12c and 12b, with the sleeve portion 35a extending into the bore portion 12b. The pivot 34 has the same radius as the inner surface of the spherical section 35c to provide a good sealing fit. The space provided between the stem 29 and the inside wall of the conical portion 35b is filled with a lubricant so as to enable the pivot 34 to freely pivot in the sealing ring. It is to be noted that a line from the center of the ball pivot 34 through the outermost and uppermost corner of the rib of the sealing ring extends through the flange and rib portion without intercepting the groove surrounding the conical portion. This assures that when the ball pivot is pressed tightly against the sealing ring, the ring will be compressed into a tight sealing engagement with the bore 12c so as to prevent gas from escaping past the pivot.

An identical sealing ring 35 is positioned on the other side of the pivot 34 and around the stem 29 so as to hold the pivot 34 tightly against the other sealing ring and to additionally provide against leakage of water past the pivot. The second ring is held snugly against the pivot 34 by means of a flexible washer 36, having an inside diameter substantially less than the outside diameter of said conical portion of said rings in alignment with the shoulder between bores 12c and 12d, and a rigid washer 37, having an outside diameter slightly less than the diameter of bore 12d and an inside diameter greater than that of said flexible washer. The periphery of the flexible washer is held against the shoulder formed by the junction of the bore sections 12c and 12d, by means of a sleeve shaped retaining nut 38 being screw threaded into the bore 12d against the washer 37. The inside diameter of the retaining nut is sufficiently great as to allow enough movement of the stem 29 to fully open the valve 17.

While the invention described above has many applications, assuming that it is installed in a system wherein the inlet 27b is connected to a hot water tank and the outlet 27c is connected to a spigot and the inlet pipe 25 of the gas valve is connected to a gas supply source with the outlet pipe 16 connected to the burner for heating the water in the water heater, the various parts of the flow valve will be in the position shown in FIGURE 1 of the drawing if the aforementioned spigot is closed. Should the spigot be turned on so as to cause the flow of water through the T, the sail 28 will be deflected toward the right by the water flow so as to pivot the stem 29 about the pivot 34 to move the ball valve 17 off of its seat and thus supply gas to the water heater. The gas will flow so long as there is demand for heating of the water due to the drawing of water. Due to the free pivoting action provided by the ball pivot and flexible bearings for the pivot the ball valve will respond to slight variations in the rate of flow of the water so that the rate of gas flow may be modulated in response to the rate of water flow. This would not be true if considerable force were required to pivot the actuating stem 29.

The same operation and function of the flow control would also take place if the flow controller were installed in a heating system whereby water is used as the heat transfer medium. Should a thermostat open a valve to permit the flow of hot water to a heat transfer means, gas would be turned on to a burner for heating the hot water supply so as to maintain the heating medium at a desired temperature.

While it is not expected that the sealing rings should permit the escape of water from the T, should there be any leakage past the sealing ring 36, it will not escape or flow into the gas stream due to the fact that the water will escape to the atmosphere through the bore 26 having a much lower pressure drop than there would be across any slight leakage path that may be present past the sealing ring 35. Obviously, should there be any leakage of gas past the sealing ring 35, it will escape to the atmosphere through the bore 26 rather than leak into the water system past the sealing ring 36 and thus contaminate the water.

As it is obvious that slight modifications may be made in the design without departing from the spirit of the invention, it is to be understood that the scope of the invention is to be determined from the appended claims.

I claim as my invention:

1. A control valve comprising a valve body having first and second intersecting and stepped bores extending therethrough, one end of the first bore serving as a fuel inlet and one end of the second bore serving as a fuel outlet, a valve seat positioned in said outlet against a shoulder of a step therein, a valve cooperable with said valve seat and having a stem extending across said first bore into the other end of said second bore, means in said other end normally biasing said valve against said valve seat, an actuating stem for said valve extending through the other end of said first bore and operably engaging said valve stem, a ball pivot on said actuating stem, a flanged sleeve-like sealing ring surrounding said actuating stem and positioned between said ball pivot and a shoulder of a step in the bore, a second flanged sleeve-like sealing ring spaced from the first mentioned ring to form an annular space therebetween and surrounding said actuating stem and positioned against a shoulder of a step in said first bore, a retainer sleeve surrounding said actuating stem and clamping a portion of said flange against a shoulder of a second step in said first bore and holding said ball pivot sealingly tight against said sealing rings, an aperture in said valve body establishing communication between the space between the two sealing rings and the atmosphere, a fluid flow housing having an inlet and an outlet and secured to said valve body so as to enclose the lower end of said actuating stem, and flow responsive means connected to said lower end for moving said valve to its open position in response to fluid flow through said housing.

2. In a control valve, the combination comprising a valve body having a fuel inlet and a fuel outlet having a shoulder therein, a valve seat positioned in said outlet against said shoulder, a valve cooperable with said valve seat and having a stem extending therefrom, means biasing said valve against said valve seat, a bore in said valve body, an actuating stem for said valve extending through said bore and operably engaging said valve stem, a ball pivot on said actauting stem, a flanged sleeve-like sealing ring surrounding said actuating stem and positioned between said ball pivot and a shoulder of a step in said bore, a second flanged sleeve-like sealing ring spaced from the first mentioned ring to form an annular space therebetween and surrounding said actuating stem and positioned against a shoulder of a step in said bore, a retainer sleeve surrounding said actuating stem and clamping a portion of said flange against a shoulder of a second step in said bore and holding said ball pivot sealingly tight against said sealing rings, a passageway extending from said annular space to the atmosphere, a fluid flow housing having an inlet and an outlet and secured to said valve body so as to enclose the lower end of said actuating stem, and flow responsive means connected to said lower end for moving said valve to its open position in response to fluid flow through said housing.

3. In a control device, the combination comprising a housing having two spaced cavities, a control device in one of said cavities, a fluid flow responsive means in the other cavity, a stepped bore extending between said cavities, an actuating stem extending through said bore and operably connected at one of its ends to said control device and at its other end to said fluid flow responsive means, a ball pivot on said stem intermediate its ends, a first elastic sealing ring surrounding said stem adjacent one side of said pivot and positioned in a step of said bore, said ring having a thin sleeve portion of a normally smaller inside diameter than the diameter of said stem and terminating in a conical portion and then in a section of a sphere having a radius equal to the radius of said ball pivot, a flange portion extending outwardly from said section and terminating in a thickened peripheral portion forming an annular groove between it and said conical portion, a second elastic sealing ring similar to said first ring and surrounding said stem adjacent the other side of said ball pivot and positioned in said step in spaced relationship with respect to said first ring to form an annular space therebetween, and a passage extending from said annular space between said rings to the exterior of said housing.

4. In a control device, the combination comprising a housing having two spaced cavities, a control device in one of said cavities, a fluid flow responsive means in the other cavity, a stepped bore extending between said cavities, an actuating stem extending through said bore and operably connected at one of its ends to said control device and at its other end to said fluid flow responsive means, a ball pivot on said stem intermediate its ends, a first elastic sealing ring surrounding said stem adjacent one side of said pivot and positioned in a step of said bore, said ring having a thin sleeve portion of a normally smaller inside diameter than the diameter of said stem and terminating in a conical portion and then in a section of a sphere having a radius equal to the radius of said ball pivot, lubricating means between said conical portion and said stem, a flange portion extending outwardly from said section and terminating in a thickened peripheral portion forming an annular groove between it and said conical portion, a second elastic sealing ring similar to said first ring and surrounding said stem adjacent the other side of said ball pivot and positioned in said step in spaced relationship with respect to said first ring to form an annular space therebetween, a second step in said bore at the lower edge of said second ring, a washer of elastic material having an outside diameter equal to the diameter of said second step and having an inside diameter less than the outside diameter of the conical portion in transverse alignment with the lower end of said first step so that there is an interference fit between the sleeve and the washer, a passage extending from said annular space to the atmosphere, and a rigid washer having an outside diameter less than the diameter of said second stem and an inside diameter less than said flexible washer, and means for holding said rigid washer against said flexible washer so as to clamp said second washer sealingly against the inner end of said second step and said sealing rings against said pivot.

5. In a control device, the combination comprising a housing having two spaced cavities, a control device in one of said cavities, a fluid flow responsive means in the other cavity, a stepped bore extending between said cavities, an actuating stem extending through said bore and operably connected at one of its ends to said control device and at its other end to said fluid flow responsive means, a ball pivot on said stem intermediate its ends, a first elastic sealing ring surrounding said stem adjacent one side of said pivot and positioned in a step of said bore, said ring having a thin sleeve portion of a normally smaller inside diameter than the diameter of said stem and terminating in an enlarged diameter portion and then in a section of a sphere having a radius equal to the radius of said ball pivot, a flange portion extending outwardly from said section, a second elastic sealing ring similar to said first ring and surrounding said stem adjacent the other side of said ball pivot and positioned in said step in spaced relationship with respect to said first ring to form an annular space therebetween, a passage extending from said annular space to the atmosphere, and means for holding said second sealing ring against said pivot and said pivot against said first sealing ring.

6. In a control device, the combination comprising a housing having two spaced cavities, a control device in one of said cavities, a fluid flow responsive means in the other cavity, a stepped bore extending between said cavities, an actuating stem extending through said bore and operably connected at one of its ends to said control device and at its other end to said fluid flow responsive means, a ball pivot on said stem intermediate its ends, a first elastic sealing ring surrounding said stem adjacent one side of said pivot and positioned in a step of said bore, said ring having a thin sleeve portion of a normally smaller inside diameter than the diameter of said stem and terminating in a conical portion and then in a section of a sphere having a radius equal to the radius of said ball pivot, lubricating means between said stem and said conical portion, a flange portion extending outwardly from said section and terminating in a thickened peripheral portion forming an annular groove between it and said conical portion, a second elastic sealing ring similar to said first ring and surrounding said stem adjacent the other side of said ball pivot and positioned in said step in spaced relationship with respect to said first ring to form an annular space therebetween, and a passage extending from said annular space between said rings to the exterior of said housing.

References Cited in the file of this patent
UNITED STATES PATENTS

| | | |
|---|---|---|
| 343,769 | Levi | June 15, 1886 |
| 2,284,910 | Long | June 2, 1942 |
| 2,696,083 | Eddy | Dec. 7, 1954 |
| 2,844,168 | Klingler | July 22, 1958 |

FOREIGN PATENTS

| | | |
|---|---|---|
| 882,482 | France | Mar. 1, 1943 |